US008607226B2

(12) United States Patent
Herrero et al.

(10) Patent No.: US 8,607,226 B2
(45) Date of Patent: Dec. 10, 2013

(54) SOLUTION FOR LOCALLY STAGED ELECTRONIC SOFTWARE DISTRIBUTION USING SECURE REMOVABLE MEDIA

(75) Inventors: Victor R. Herrero, Poughkeepsie, NY (US); Michael L. Vuozzo, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 1440 days.

(21) Appl. No.: 12/017,928

(22) Filed: Jan. 22, 2008

(65) Prior Publication Data

US 2009/0185690 A1    Jul. 23, 2009

(51) Int. Cl.
*G06F 9/445* (2006.01)

(52) U.S. Cl.
USPC ............................ 717/177; 717/174; 717/176

(58) Field of Classification Search
USPC .................................................. 717/168–178
See application file for complete search history.

(56) References Cited

U.S. PATENT DOCUMENTS

| | | | |
|---|---|---|---|
| 4,924,378 A | 5/1990 | Hershey et al. | |
| 4,937,863 A | 6/1990 | Robert et al. | |
| 5,138,712 A | 8/1992 | Corbin | |
| 5,204,897 A | 4/1993 | Wyman | |
| 5,438,508 A | 8/1995 | Wyman | |
| 5,553,143 A | 9/1996 | Ross et al. | |
| 5,664,206 A * | 9/1997 | Murow et al. ..................... 704/8 | |
| 5,715,314 A | 2/1998 | Payne et al. | |
| 5,745,879 A | 4/1998 | Wyman | |
| 5,754,763 A | 5/1998 | Bereiter | |
| 5,758,069 A | 5/1998 | Olsen | |
| 5,790,664 A | 8/1998 | Coley et al. | |
| 5,845,077 A | 12/1998 | Fawcett | |
| 5,903,650 A | 5/1999 | Ross et al. | |
| 5,905,860 A | 5/1999 | Olsen et al. | |
| 6,029,145 A | 2/2000 | Barritz et al. | |
| 6,067,582 A | 5/2000 | Smith et al. | |
| 6,105,069 A | 8/2000 | Franklin et al. | |
| 6,108,420 A | 8/2000 | Larose et al. | |
| 6,167,568 A | 12/2000 | Gandel et al. | |
| 6,189,146 B1 | 2/2001 | Misra et al. | |
| 6,195,432 B1 | 2/2001 | Takahashi et al. | |
| 6,249,866 B1 * | 6/2001 | Brundrett et al. ............. 713/165 | |
| 6,367,073 B2 | 4/2002 | Elledge | |

(Continued)

OTHER PUBLICATIONS

Bellissimo et al., "Secure Software Updates: Disappointments and New Challenges," 2006, USENIX Association, p. 37-43.*

(Continued)

*Primary Examiner* — Qing Chen
(74) *Attorney, Agent, or Firm* — Schmeiser, Olsen & Watts, LLP; Arthur J. Samodovitz (57) ABSTRACT

A method, information processing system, and computer program storage product, are provided for creating a Removable Installation Kit ("RIK") for locally staged electronic software distribution on a user system. The method includes selecting at least one software package from a list of software packages on a software distribution server. A set of data elements is created that is associated with an RIK to be created using the at least one software package. The set of data elements is stored at the software distribution server. A temporary copy of the at least one software package that has been selected is stored. The RIK is created by placing at least the software package that has been selected and a unique identifier associated with the RIK on at least one removable storage medium.

12 Claims, 4 Drawing Sheets

(56) References Cited

U.S. PATENT DOCUMENTS

| | | | |
|---|---|---|---|
| 6,385,596 | B1 | 5/2002 | Wiser et al. |
| 6,493,871 | B1 | 12/2002 | McGuire et al. |
| 6,513,159 | B1 | 1/2003 | Dodson |
| 6,577,735 | B1 * | 6/2003 | Bharat ............... 380/286 |
| 6,604,238 | B1 | 8/2003 | Lim et al. |
| 6,697,852 | B1 | 2/2004 | Ryu |
| 6,718,549 | B1 | 4/2004 | Narin et al. |
| 6,754,707 | B2 | 6/2004 | Richards et al. |
| 6,891,953 | B1 | 5/2005 | DeMello et al. |
| 6,966,002 | B1 * | 11/2005 | Torrubia-Saez ........... 726/29 |
| 7,080,371 | B1 * | 7/2006 | Arnaiz et al. ............. 717/170 |
| 7,143,409 | B2 | 11/2006 | Herrero |
| 7,533,370 | B2 * | 5/2009 | Nave et al. ............... 717/126 |
| 7,584,470 | B2 * | 9/2009 | Barker et al. ............. 717/177 |
| 2001/0011238 | A1 | 8/2001 | Eberhard et al. |
| 2001/0047368 | A1 * | 11/2001 | Oshinsky et al. ......... 707/204 |
| 2002/0078203 | A1 | 6/2002 | Greschler et al. |
| 2002/0128975 | A1 | 9/2002 | Klemba et al. |
| 2002/0157089 | A1 | 10/2002 | Patel et al. |
| 2002/0174422 | A1 | 11/2002 | Kelley et al. |
| 2003/0005427 | A1 * | 1/2003 | Herrero ..................... 717/178 |
| 2003/0233363 | A1 * | 12/2003 | Cohen et al. .............. 707/100 |
| 2004/0015961 | A1 | 1/2004 | Chefalas et al. |
| 2005/0015621 | A1 * | 1/2005 | Ashley et al. ............. 713/201 |
| 2005/0066324 | A1 | 3/2005 | Delgado et al. |
| 2005/0091534 | A1 * | 4/2005 | Nave et al. ................ 713/201 |
| 2005/0240921 | A1 * | 10/2005 | Barker et al. ............. 717/175 |
| 2006/0064488 | A1 | 3/2006 | Ebert |

OTHER PUBLICATIONS

Roseman & Greenberg, Building Real-Time Groupware with GroupKit, A Groupware Toolkit, ACM 1073-0516/96/0300-0066, ACM Transactions on Computer-Human Interaction, Mar. 1996, pp. 66-106, vol. 3 No. 1, Canada.

Hart, Electronic Delivery of Software: Implementation of a Robust, Effective Solution, Copyright 2002 ACM 1-58113-564-5/02/0011, SIGUCC'02, Nov. 20-23, 2002, p. 177, Providence, Rhode Island, USA.

Grimm, System Support for Pervasive Applications, 2004 ACM 0734-2071/04/1100-421, ACM Transactions of Computer Systems, Nov. 2004, pp. 421-486, vol. 22, No. 4, Broadway, NY.

Medjahed et al.; Business-to-business interactions: issues and enabling technologies, The VLDB Journal (2003) 12, Digital Object Identifier (DOI) 10.1007/S00778-003-0087-Z, Springer-Verlag 2003, Apr. 3, 2003, pp. 59-85.

Bartoletti et al.; Secure Software Distribution System; UCRL-JC-123354; Jun. 18, 1997; 11 pages.

* cited by examiner

SOLUTION FOR LOCALLY STAGED ELECTRONIC SOFTWARE DISTRIBUTION USING SECURE REMOVABLE MEDIA

FIELD OF THE INVENTION

The present invention generally relates to the field of Electronic Software Distribution, and more particularly relates to the electronic software distribution requirements of geographically distributed corporations whose employees may be located in remote, low bandwidth locations.

BACKGROUND OF THE INVENTION

Medium to large corporations typically use a centrally managed, enterprise-wide electronic software distribution ("ESD") application to install software on employee workstations. The ESD application allows for the software to be installed in an automated manner using standard software packages. The software is packaged in such a way that only certain approved options are offered. This allows for the software to be installed the same way for all employees. The software is usually made available via a central shopping interface such as a Web-based software catalog. Access to the software is controlled via entitlement functions such as those discussed in U.S. Pat. No. 7,143,409, entitled "Automated Entitlement Verification For Delivery Of Licensed Software Patent Application," which is commonly owned by International Business Machines Corporation, Armonk, N.Y. and is hereby incorporated by reference in its entirety.

Typically, a network installation is performed using an image staging server located near the target workstation as discussed in the U.S. Pat. No. 6,928,481, entitled "Method, Apparatus and Program to Optimize the Network Distribution of Digital Information Based on Hierarchical Grouping of Server Topology and Code Distribution," which is commonly owned by International Business Machines Corporation, Armonk, N.Y. and is hereby incorporated by reference in its entirety. The goal is to make a standard set of software available to employees for reducing packaging and administrative/support costs (e.g., Help Desk). However, with conventional ESD systems, problems occur when employees are located in low bandwidth network locations. An employee without sufficient network resources may not be able to download the proper software packages from the ESD system.

One problem with conventional locally staged installation solutions is that special installation mechanisms and special packaging are required to support Removable Installation Kit ("RIK") installations. For example, one conventional solution that is used to deliver multiple versions of a single product via a single CD/DVD set requires special packaging. The local installation prompts the user to enter a product key that is used to determine which version of the product (i.e., which package components) is installed. The local installation communicates with a server to verify that the product key is valid. The user experience is significantly different from that of a Web-based ESD application.

Other solutions modify a product package to include either user specific or machine specific information/components. In these solutions, entitlement is not performed independently of the package. The resulting RIK is, therefore, user or machine specific. This RIK generally cannot be used to support a wide group of customers, and therefore do not scale for medium to large corporations.

Therefore a need exists to overcome the problems with the prior art as discussed above.

SUMMARY OF THE INVENTION

Briefly, in accordance with various embodiment of the present invention, disclosed are a method, information processing stream, and computer readable medium for creating a Removable Installation Kit ("RIK") for locally staged electronic software distribution on an end-user system. The method includes selecting at least one software package from a list of software packages on a software distribution server. A set of data elements is created that is associated with an RIK to be created using the at least one software package. The set of data elements is stored at the software distribution server. A temporary copy of the at least one software package that has been selected is stored. The RIK is created by placing at least the software package that has been selected and a unique identifier associated with the RIK on at least one removable medium.

In another embodiment, a method for performing a locally staged software installation using a Removable Installation Kit ("RIK") is disclosed. The method includes receiving from an end-user system a request for installing at least one software package using an RIK. A unique identifier associated with the RIK is received from end-user's system. The unique identifier is located on a removable medium associated with the RIK. A set of candidate software packages is presented to an end-user who is associated with the end-user system, is presented in response to receiving the unique identifier. The method further includes determining that the user has initiated an installation operation. A remote installation client, which is loaded onto the end-user system, prompts the user to mount the removable media which includes the selected package and performs a locally staged installation of the package.

In yet another embodiment, an information processing system for creating a Removable Installation Kit ("RIK") for locally staged electronic software distribution on an end-user system. The information processing system includes a memory and a processor that is communicatively coupled to the memory. The information processing system further includes an RIK creation module that is adapted to select at least one software package from a list of software packages on a software distribution server. A set of data elements is created that is associated with an RIK to be created using the at least one software package. The set of data elements is stored at the software distribution server. A temporary copy of the at least one software package that has been selected is stored. The RIK is created by placing at least the software package that has been selected and a unique identifier associated with the RIK on at least one removable medium.

One advantage of the various embodiments of the present invention is that locally staged installations of software can be performed using RIKs. Another advantage is that existing ESD functions such as shopping interfaces, authentication, entitlement, license verification, standard packages, installation behavior, and the like are preserved and special packaging is not required. For example, existing package repositories can be used as compared to conventional locally staged installation solutions, which require special installation mechanisms and special packaging. Another advantage is that the status of RIK packages (i.e., active, inactive, RIK install only) and the entitlement criteria associated with RIK packages are centrally controlled by an ESD manager. RIKs can include subsets of available packages that are required by different customer audiences (e.g., a "Human Resources"

division specific RIK). Yet another advantage is that RIKs cannot be used outside of the control of the EDS application, thereby providing a secure implementation. The various embodiments leverage existing package repositories and allow the entitlement criteria/functions to be maintained/performed independently of the RIK. However, the RIK itself is protected via encryption. The ESD application decrypts the removable media at installation time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Software Deployment Environment

Figure 1:
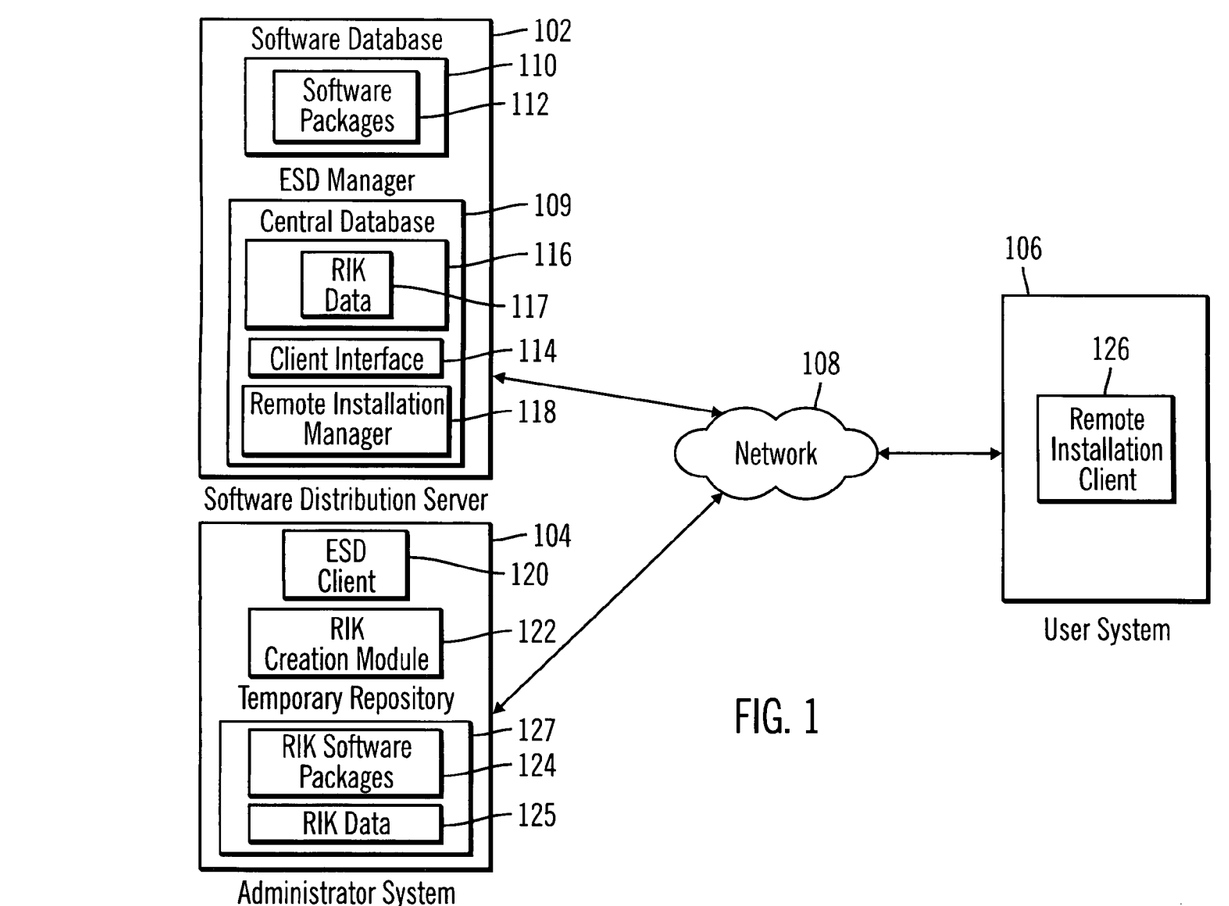
FIG. 1 is a block diagram illustrating an electronic software distribution environment according to one embodiment of the present invention.

According to one embodiment of the present invention, as shown in FIG. 1, one example of a software deployment environment is shown. It should be noted that this configuration is intended to be illustrative and does not limit the present invention in any way. FIG. 1 shows a software distribution server 102 communicatively coupled to one or more administrator systems 104 and one or more user systems 106 via a network 108. The network 108 can comprise any number of networks such as the Internet, a Wide Area Network, and/or a Local Area Network.

In one embodiment, the user system 106 is associated with an employee of a company that is utilizing the software distribution server 102. In other words, the company subscribes to the software distribution server 102 for providing software packages to its employees. The administrator system 104, in one embodiment, is associated with an administrator of the company that creates and manages, among other things, Removable Installation Kits ("RIKs") for the employees. RIKs are discussed in greater detail below. The software distribution server 102, in one embodiment, comprises various software packages available for download by the user system 104. It should be noted that one or more software packages can also reside on a remote system and can be accessed by a user or administrator system 106, 104 via the software distribution server 102. In one embodiment, the software distribution server 102 also manages the installation of a software package on a user system 106.

The software distribution server 102, in one embodiment, comprises a software database 110 that includes a plurality of software packages 112. As discussed above, the software database 110 or a set of software packages 112 can also reside on one or more remote systems. The software distribution server 102 also includes an ESD manager (software delivery manager) 109 comprising a client interface 114 that provides an interface for the user system 106 and/or the administrator system 104 to interact with the software distribution server 102. The ESD manager 109 also manages the download of software to the user system 106 and the administrator system 104.

The ESD manager 109 also comprises a central database 116, which maintains information associated with each RIK created by an administrator. The central database 116, in one embodiment, includes RIK data 117. A remote installation manager 118 is also included in the ESD manager 109. The remote installation manager 118 monitors and manages a software package installation associated with an RIK at the user system 106. Each of these components residing within the software distribution server 102 as discussed in greater detail below.

The administrator system 104, in one embodiment, includes a software distribution client 120. The software distribution client 120 allows for the administrator system 104 to communicate with the software distribution server 102. In particular, the software distribution client 120 allows for an administrator to select and download various software packages 112 from the software database 110 for creating an RIK. The RIK software packages 124 and RIK data 125 are downloaded to a temporary repository 127 on the administrator system 104. The administrator uses a RIK creation module 122 to create RIKs from these downloaded software packages 124. Each of these components residing on the administrator system 104 is discussed in greater detail below. The user system 106, in one embodiment, includes a remote installation client 126. The remote installation client 126 provides an interface to the software distribution server 102 for installing software packages using an RIK. The remote installation client 126 is discussed in greater detail below.

One advantage of various embodiments of the present invention is that the problem of supporting employees which reside in low bandwidth network is overcome. For example, in one embodiment, a Web-based ESD application is extended to support locally staged installations using secure removable media in a manner which preserves existing ESD functions and requires no special packaging. For example, existing package repositories can be used as compared to conventional locally staged installation solutions, which require special installation mechanisms, special packaging, and special entitlement functions.

Another advantage is that a system for creating RIKs is presented that preserves existing ESD functions such as shopping interfaces, authentication, entitlement, license, verification, standard packages, installation behavior and the like. Preserving existing ESD functions is advantageous because existing ESD capabilities can be leveraged while maintaining an almost identical customer experience for both network and RIK installations.

Locally Staged Electronic Software Distribution Using Removable Media

In one embodiment, an administrator, via the ESD client 120 communicates with the software distribution server 102 for creating one or more RIKs. For example, the ESD client 120 can communicate with the software distribution server 102 via the client interface 114 such as a web-based interface. The administrator can browse the software database 110 via the web-based interface. Once example of a web-based interface is discussed in U.S. Pat. No. 7,143,409.

The administrator then selects software packages 112 from the software database 110 to be included in a RIK. The ESD manager 109 allows an administrator to select all software packages, a category of packages, geographic specific packages and other packages based on any search criteria. For example, an administrator can also select software packages 112 based on the size of the package. The administrator, via the ESD client 120, specifies a unique identifier for the RIK to be created. For example, the administrator can enter "Package_ABC" to uniquely identifier the RIK. Alternatively, the administrator can enter the unique identifier during the RIK creation process at the administrator system 104 via the RIK creation tool 122. In this embodiment, the unique identifier is transmitted to the software distribution server 102.

The ESD manager 109 generates a private encryption/public decryption key pair for the RIK to be created. It should be noted that any encryption/decryption method can be utilized by embodiments of the present invention. An RIK definition associated with the RIK to be created is stored in a central database 116 as part of the RIK data 117. The data elements within an RIK definition 117 can include the RIK unique identifier such as Package_ABC; the encryption key; the decryption key; a list of unique package identifiers such as the title of each package; and the size of the removable media to be used for creating the RIK. It should be noted that this data element list is not exhaustive.

The administrator initiates a download only installation of the selected software packages (RIK packages) to a temporary local repository 127. In addition to the downloaded software packages 124 the temporary repository 127 also includes one or more commands (as part of the RIK data 117) for enabling a user to initiate the remote installation client 126. The temporary repository 127 also includes a configuration file (as part of the RIK data 125) that includes the unique identifier of the RIK. A mapping of the software packages 124 is also included as part of the RIK data 127. A package-image map that is associated with the RIK provides a mapping of at least one software package to at least one removable medium. For example, each software package 124 is associated with a removable medium such as package 1 is on CD 1 of 5. An example of package mapping is given in pseudo code below.

```
C:\RIK\Images
    \Package_ABC    // includes the RIK directory structure which is
                       copied to the removable media
                    // Directory Package_ABC is not copied to the
                       removable media
    \RIKImage1
    startup.exe     // startup command which does not get encrypted
    startup.cnf     // startup configuration file which identifies RIK
                       and does not get encrypted
    pkgmap.dat      // package-image map
        \Pkgs1      // RIK package repository which gets encrypted
        \Notes
        \SameTime
        \Pkgs2
        \Product XYZ
```

Once the software packages 124 are downloaded, the RIK creation module 122 encrypts the package source directories (i.e., the contents of directories Packages discussed above). Once the directory structure is created, the administrator uses a media creation tool (not shown) of choice to create the physical media (e.g., creates an ISO image and burns a set of CDs or DVDs). In other words, the administrator creates the RIK. The administrator then makes the RIK available for ordering or distribution to customers.

It should be noted that since the software packages 124 are encrypted, they can only be decrypted by the ESD manager 109 via a centrally maintained decryption key. Therefore, an RIK cannot be used outside the control of the remote installation client 126. It should also be noted that various embodiments of the present invention can also utilize non-encrypted software packages 124 and RIKs. It should be noted that the present invention is also applicable to other types of applications that deliver content to a target workstation or device. For example, at least one embodiment present invention can be applied to an application that installs an image on a target workstation such as a workstation build application. It should also be noted that the software distribution server 102 may also comprise existing RIKs that the administrator can copy, clone, or delete. An administrator can also save an RIK at the software distribution server 102 as a "draft".

A user at the user system 106 communicates with the server distribution server 102 for requesting a locally staged software delivery. For example, the user can communicate with the ESD manager 109 via a web browser and browse the software database 110. The web-based interface, in one embodiment, provides an option for the user to request that the ESD manager use a RIK. When a user selects this option, the ESD manager 109 prompts the user to place the first removable media in the RIK on his workstation (e.g., user inserts the first CD or DVD).

Once a user notifies the ESD manager 109 that the removable media has been inserted, the remote installation manager 118 manager launches an agent which runs on the user system 106 such as the remote installation client 126. The remote installation client 126 detects the RIK, reads the RIK unique identifier stored in configuration file (e.g., startup.cnf) as discussed above. The remote installation client 126 passes the identifier to the remote installation manager 118. In one embodiment, the communication between the remote installation client 126 and the remote installation manager 118 is a secure communication such as an SSL link, encrypted, and the like.

The remote installation manager 118, in one embodiment, looks up the packages which are included in the RIK. This information is stored in the central database 116. A list of candidate packages is created. In one embodiment, the remote installation manager 118 removes any package from the list that has been updated or removed since the RIK was created. Note that the central database 116 also maintains a status for each package that allows a package to be supported for network installation, RIK installation, or both. Therefore, the remote installation manager 118 can support the installation of older packages that reside on RIKs for a period of time after network installation support has been terminated.

The remote installation manager 118 also removes any package from the list that the user is not entitled to install. This is done by using entitlement rules associated with each package. Entitlement rules are further discussed in U.S. Pat. No. 7,143,409. The final list of packages is displayed to the user for installation. The user can then launch an installation and the remote installation manager 118 detects that a RIK installation has been launched. The remote installation manager 118 uses a secure communication to download the decryption key (which is stored in the central database 116, as discussed above) to the user system 106.

The remote installation manager 118 ensures that the correct RIK removable media is mounted on the user system 106. For example, the remote installation manager 118 uses a mapping file such as the pkgmap.dat file discussed above. If the wrong media is mounted, the ESD manager 109 asks the user to install the correct media (e.g., "please install CD #1 of 5"). Once the correct media is mounted, the remote installation manager 118 decrypts the contents of the RIK removable media, which includes the package, and performs a locally staged installation. Once the installation is complete, the media is un-mounted and cleanup of any local copies of files is performed. The remote installation manager 118 then records the results of the installation in its central database.

As can be seen from the above discussion, various embodiments of the present invention provide an advantageous system for performing locally staged installations of software using RIKs. Existing ESD functions such as shopping interfaces, authentication, entitlement, license verification, standard packages, installation behavior, and the like are preserved and special packaging is not required. For example, existing package repositories can be used as compared to conventional locally staged installation solutions, which require special installation mechanisms and special packaging. Another advantage is that the status of RIK packages (i.e., active, inactive, RIK install only) and the entitlement criteria associated with RIK packages are centrally controlled by the ESD manager 109 (i.e., they may be changed independently of RIKs). RIKs can include subsets of available packages that are required by different customer audiences (e.g., a "Human Resources" division specific RIK). Yet another advantage is that RIKs cannot be used outside of the control of the EDS application, thereby providing a secure implementation.

Information Processing System

Figure 2:
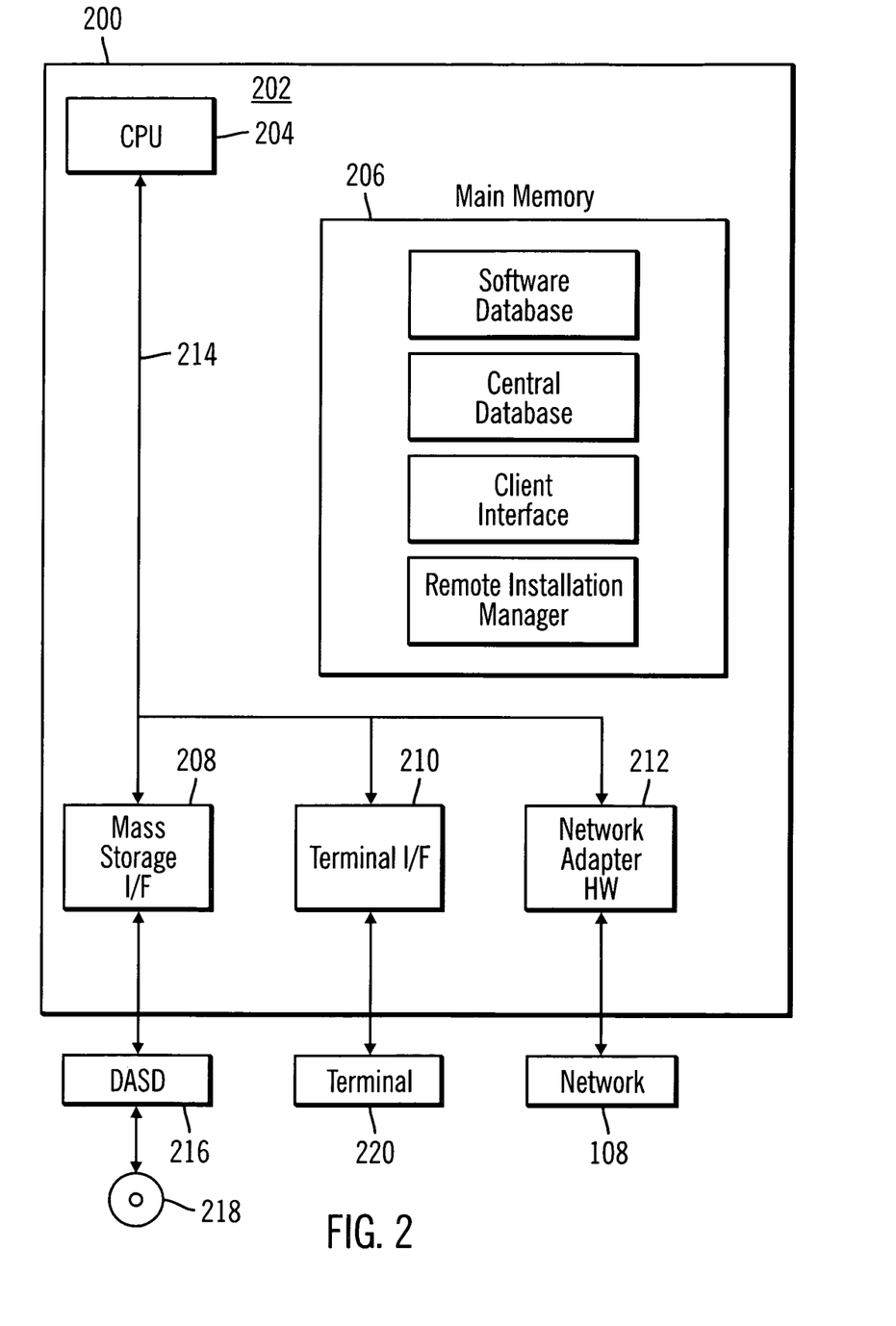
FIG. 2 is a detailed view of an information processing system according to one embodiment of the present invention.

FIG. 2 is a block diagram illustrating a detailed view of an information processing system 200 such as the software distribution server 102, administration system 104, or the user system 106. The following discussion is with respect to the software distribution server 102; however, it is also applicable to each of the administration system 104 and the user system 106 . . . . The information processing system 200 is based upon a suitably configured processing system adapted to implement the one embodiment of the present invention. Any suitably configured processing system is similarly able to be used as the information processing system 102 by various embodiments of the present invention, for example, a personal computer, workstation, server, or other computer system.

The information processing system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the information processing system 102. One specific type of data storage device is a computer readable medium such as an optical disk, which may be used to store data such as an encoded program. Another type of data storage device is a data storage device configured to support, for example, NTFS type file system operations.

The main memory 206, in one embodiment, comprises the software database 110, software delivery module 114, central database 116, and remote installation manager 118. Although illustrated as concurrently resident in the main memory 206, it is clear that respective components of the main memory 206 are not required to be completely resident in the main memory 206 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the information processing system 102.

Although only one CPU 204 is illustrated for computer 202, computer systems with multiple CPUs can be used equally effectively. Various embodiments of the present invention further incorporate interfaces that each includes separate, fully programmed microprocessors that are used to off-load processing from the CPU 204. Terminal interface 210 is used to directly connect one or more terminals 220 to computer 202 to provide a user interface to the computer 202. These terminals 220, which are able to be non-intelligent or fully programmable workstations, are used to allow system administrators and users to communicate with the information processing system 102. The terminal 220 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 102. The network adapter hardware 212 is used to provide an interface to a network 108. Various embodiments of the present invention are able to be adapted to work with any data communications connections including present day analog and/or digital techniques or via a future networking mechanism.

Although the various embodiments of the present invention are described in the context of a fully functional computer system, those skilled in the art will appreciate that embodiments are capable of being distributed as a program product via CD or DVD, e.g. CD 218, CD ROM, or other form of recordable media, or via any type of electronic transmission mechanism.

Process for Creating an RIK for Distribution Via Removable Media

Figure 3:
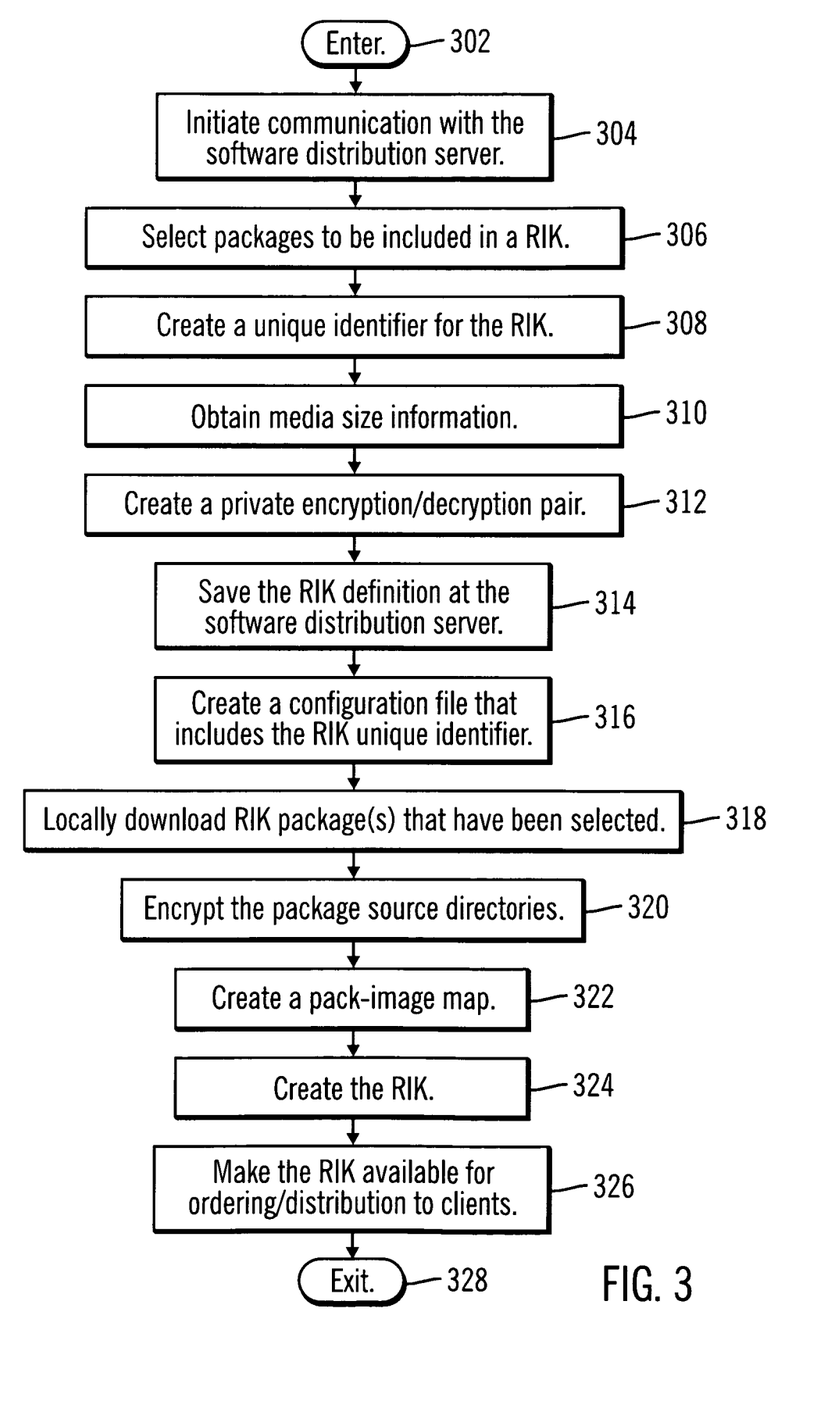
FIG. 3 is an operational flow diagram illustrating a process of an administrator creating an RIK for distribution to a client using removable media according to one embodiment of the present invention.

FIG. 3 is an operational diagram illustrating a process for creating an RIK that is to be distributed via removable media. The operational diagram of FIG. 3 begins at step 302 and flows directly to step 304. An administrator, at step 304, initiates communication with the software distribution sever 102. For example, the administrator, communicates with the software distribution sever 102 via the client interface 114, which can be a web-based interface. The administrator, at step 306, selects a set of software packages 112 to be part of an RIK, as discussed above.

The administrator, at step 308, creates a unique identifier to be associated with the RIK to be created. The administrator, at step 310, specifies the size of the removable media such as a size value used to determine how to store packages across a set of removable media (e.g., how to fit packages on a set of CDs). A private encryption/public decryption key pair, at step 312, is generated. The RIK definition, which can include the unique identifier, encryption/public decryption key pair, and other elements as discussed above, at step 314, are stored at the central database 116. A configuration file (e.g., startup.cnf), at step 316 is created, and the RIK unique identifier is stored therein.

The selected RIK package(s), at step 318, is downloaded and stored locally in a temporary repository 127. Package source directories, at step 320, are created and encrypted. A package-to-image map (e.g., file pkgmap.dat), at step 322, is created. The administrator, at step 324, then creates the RIK. For example, the administrator creates an ISO image comprising the software packages on removable media such as a CD or DVD. The RIK, at step 326, is then made available for ordering or distribution by/to an end-user. The control flow then exits at step 328.

Process for Software Shopping and Software Delivery Via an RIK

Figure 4:
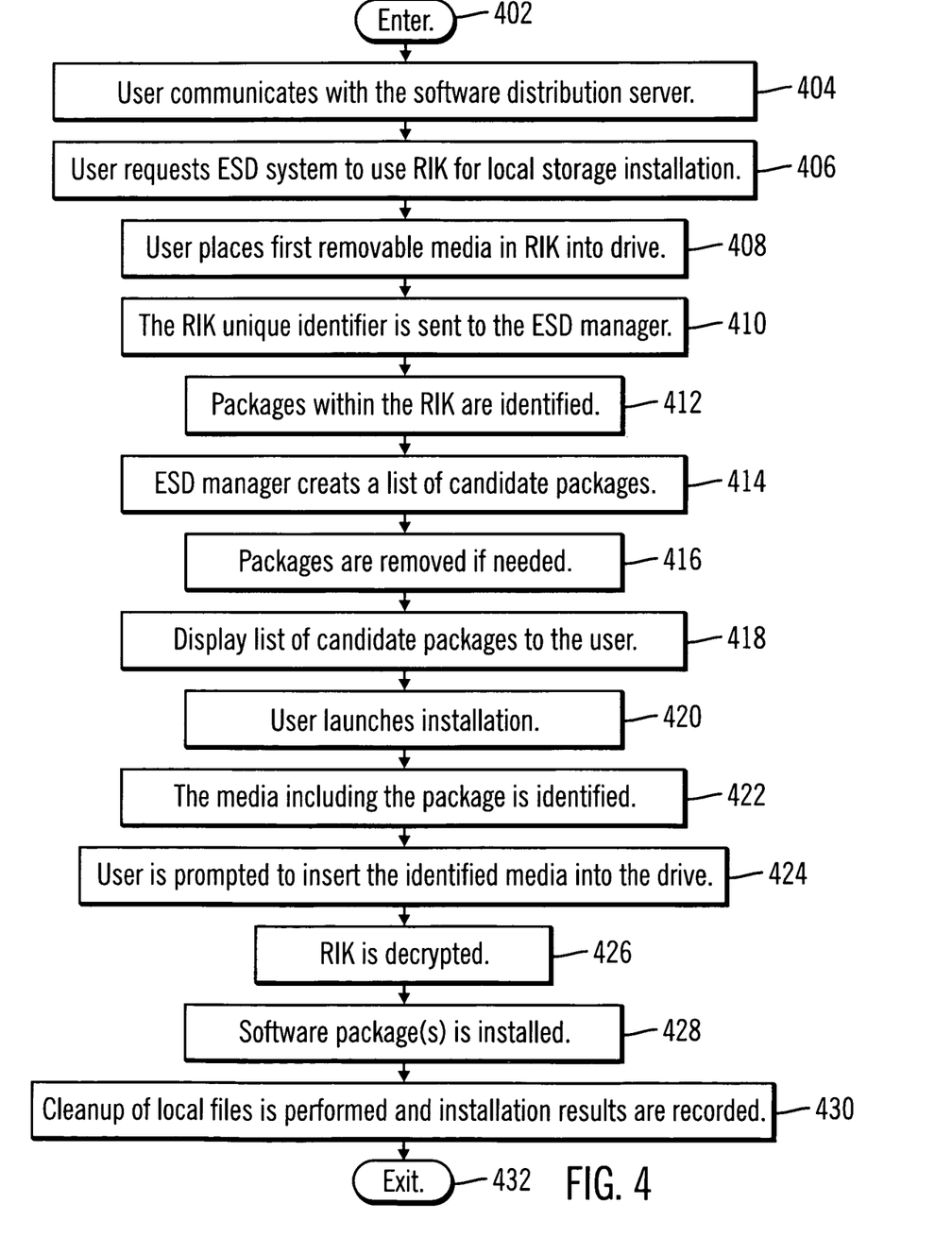
FIG. 4 is an operational flow diagram illustrating a process of a local storage installation operation for an RIK being performed at an end-user system according to one embodiment of the present invention.

FIG. 4 is an operational diagram illustrating a process of a local storage installation operation for an RIK being performed at an end-user system. The operational diagram of FIG. 4 begins at step 402 and flows directly to step 404. An end-user, at step 404, communicates with the software distribution server 102. For example, the user communicates with the software distribution server 102 via a web-based interface. The user, at step 406, selects an option at the client interface 114 of the software distribution server 102 that indicates the user desires to use an RIK for local storage installation. Alternately, the user may launch the client interface 114 in RIK mode via the removable media (e.g., startup.exe).

The remote installation manager, at step 408, 118 prompts the user to place the first removable media in the RIK into a drive and launches the remote installation client 126 on the user system. The remote installation client 126, at step 410, sends the RIK unique identifier to the remote installation manager 118. The remote installation manager 118, at step 412, identifies the software packages within the RIK. The remote installation manager 118, at step 414, determines a software package candidate list. If any of the packages need to be removed from the candidate list (e.g., outdated packages, packages which the user is not entitled to install, etc.), the remote installation manager 118, at step 416, optionally removes the package from the list.

The remote installation manager 118, at step 418, displays the list of candidate software packages to the user via the client interface 114. The remote installation manager 118, at step 420, determines that the user has launched an installation and runs an agent such as the remote installation client 126 at the user system 106. The remote installation client 126, at step 422, identifies the media which includes the selected package. The remote installation client 126, at step 424, prompts the user to insert the appropriate media (e.g., CD 2 of 5). The remote installation client 118, at step 426, decrypts the RIK. The selected software package, at step 428, is then installed. The remote installation client 126, at step 430, deletes any local copies of files and communicates with the ESD manager 109 to record the installation results. The control flow then exits at step 432.

Non-Limiting Examples

The various embodiments of the present invention can be realized in hardware, software, or a combination of hardware and software. A system according to one embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the various embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention

What is claimed is:

1. A method for creating a Removable Installation Kit ("RIK") for locally staged electronic software distribution on a user system, the method comprising the steps of:

an administrator server computer selecting a software package from a list of software packages on a software distribution server computer, wherein the software distribution server computer and the administrator server computer are communicatively coupled to each other via a network;

after the step of the administrator server computer selecting the software package, the administrator server computer specifying a unique identifier of the RIK and transmitting the unique identifier of the RIK to the software distribution server computer;

the software distribution server computer generating a mapping of the software package to a computer readable removable storage device;

after the step of the administrator server computer transmitting the unique identifier of the RIK to the software distribution server computer, the administrator server computer receiving from the software distribution server computer (i) the software package and (ii) RIK data comprising the mapping, the unique identifier of the RIK, an encryption key, a decryption key for decrypting data encrypted using the encryption key, and a size of the computer readable removable storage device;

the administrator server computer encrypting, using the encryption key, each source directory associated with the software package; and the administrator server computer creating the RIK by copying to the computer readable removable storage device: the software package and the unique identifier of the RIK.

2. The method of claim 1, further comprising:
the administrator server computer creating a set of images associated with the software package based on the size of the computer readable removable storage device, wherein the set of images includes directory structures for creating the RIK on the computer readable removable storage device.

3. The method of claim 1, wherein the computer readable removable storage device is selected from the group consisting of a Compact Disc, a Digital Video Disk, a flash drive, and a portable hard drive.

4. The method of claim 1, wherein the received RIK data consists of the mapping, the unique identifier of the RIK, the encryption key, the decryption key for decrypting data encrypted using the encryption key, and the size of the computer readable removable storage device.

5. An information processing system for creating a Removable Installation Kit ("RIK") for locally staged electronic software distribution on a user system, the information processing system comprising an administrator server computer, the administrator server computer comprising:
a computer readable memory;
a processor communicatively coupled to the computer readable memory;
a computer readable non-transitory storage device;
first program instructions, for the administrator server computer, to select a software package from a list of software packages on a software distribution server computer, wherein the software distribution server computer and the administrator server computer are communicatively coupled to each other via a network;
second program instructions, for the administrator server computer, after the software package has been selected by the administrator server computer, to specify a unique identifier of the RIK and transmit the unique identifier of the RIK to the software distribution server computer;
third program instructions, for the software distribution server computer, to generate a mapping of the software package to a computer readable removable storage device;
fourth program instructions, for the administrator server computer, to receive from the software distribution server computer, after the unique identifier of the RIK has been transmitted by the administrator server computer to the software distribution server computer: (i) the software package and (ii) RIK data comprising the mapping, the unique identifier of the RIK, an encryption key, a decryption key for decrypting data encrypted using the encryption key, and a size of the computer readable removable storage device;

fifth program instructions, for the administrator server computer, to encrypt, using the encryption key, each source directory associated with the software package; and sixth program instructions, for the administrator server computer, to create the RIK by copying to the computer readable removable storage device: the software package and the unique identifier of the RIK;

wherein the first program instructions, the second program instructions, the third program instructions, the fourth program instructions, the fifth program instructions, and the sixth program instructions are stored on the computer readable non-transitory storage device for execution by the processor via the computer readable memory.

6. The information processing system of claim 5, wherein the administrator server computer further comprises:
seventh program instructions, for the administrator server computer, to create a set of images associated with the software package based on the size of the computer readable removable storage device, wherein the set of images includes directory structures for creating the RIK on the computer readable removable storage device,
wherein the seventh program instructions are stored on the computer readable non-transitory storage device for execution by the processor via the computer readable memory.

7. The information processing system of claim 5, wherein the computer readable removable storage device is selected from the group consisting of a Compact Disc, a Digital Video Disk, a flash drive, and a portable hard drive.

8. The information processing system of claim 5, wherein the received RIK data consists of the mapping, the unique identifier of the RIK, the encryption key, the decryption key for decrypting data encrypted using the encryption key, and the size of the computer readable removable storage device.

9. A computer program product for creating a Removable Installation Kit ("RIK") for locally staged electronic software distribution on a user system, the computer program product comprising:
first program instructions, for an administrator server computer, to select a software package from a list of software packages on a software distribution server computer, wherein the software distribution server computer and the administrator server computer are communicatively coupled to each other via a network;
second program instructions, for the administrator server computer, after the software package has been selected by the administrator server computer, to specify a unique identifier of the RIK and transmit the unique identifier of the RIK to the software distribution server computer;
third program instructions, for the software distribution server computer, to generate a mapping of the software package to a computer readable removable storage device;
fourth program instructions, for the administrator server computer, to receive from the software distribution server computer, after the unique identifier of the RIK has been transmitted by the administrator server computer to the software distribution server computer: (i) the software package and (ii) RIK data comprising the mapping, the unique identifier of the RIK, an encryption key, a decryption key for decrypting data encrypted using the encryption key, and a size of the computer readable removable storage device;

fifth program instructions, for the administrator server computer, to encrypt, using the encryption key, each source directory associated with the software package; and sixth program instructions, for the administrator server computer, to create the RIK by copying to the computer readable removable storage device: the software package and the unique identifier of the RIK;

wherein the first program instructions, the second program instructions, the third program instructions, the fourth program instructions, the fifth program instructions, and the sixth program instructions are stored on a computer readable non-transitory storage device of the administrator server computer for execution by a processor of the administrator server computer via a computer readable memory of the administrator server computer.

10. The computer program product of claim 9, further comprising:

seventh program instructions, for the administrator server computer, to create a set of images associated with the software package based on the size of the computer readable removable storage device, wherein the set of images includes directory structures for creating the RIK on the computer readable removable storage device, wherein the seventh program instructions are stored on the computer readable non-transitory storage device of the administrator server computer for execution by the processor of the administrator server computer via the computer readable memory of the administrator server computer.

11. The computer program product of claim 9, wherein the computer readable removable storage device is selected from the group consisting of a Compact Disc, a Digital Video Disk, a flash drive, and a portable hard drive.

12. The computer program product of claim 9, wherein the received RIK data consists of the mapping, the unique identifier of the RIK, the encryption key, the decryption key for decrypting data encrypted using the encryption key, and the size of the computer readable removable storage device.

* * * * *